(12) United States Patent
Felknor et al.

(10) Patent No.: US 7,171,782 B2
(45) Date of Patent: Feb. 6, 2007

(54) PLANTER FOR GROWING PLANTS

(75) Inventors: Wilson A. Felknor, Clinton, TN (US); Ron C. Hicks, Vonore, TN (US)

(73) Assignee: Felknor Ventures, LLC, Knoxville, TN (US)

( * ) Notice: Subject to any disclaimer, the term of this patent is extended or adjusted under 35 U.S.C. 154(b) by 0 days.

(21) Appl. No.: 11/046,290

(22) Filed: Jan. 28, 2005

(65) Prior Publication Data

US 2005/0166452 A1   Aug. 4, 2005

Related U.S. Application Data

(60) Provisional application No. 60/541,193, filed on Feb. 2, 2004.

(51) Int. Cl.
*A01G 23/02* (2006.01)
*A01G 9/02* (2006.01)
*A47G 7/02* (2006.01)

(52) U.S. Cl. .................. 47/73; 47/65.5; 47/67

(58) Field of Classification Search ............... 47/73, 47/63, 83, 64, 59 S, 62 R, 67, 39, 65.7, 65.8
See application file for complete search history.

(56) References Cited

U.S. PATENT DOCUMENTS

| | | | | |
|---|---|---|---|---|
| 4,059,921 A | * | 11/1977 | Moriwaki | 47/73 |
| 4,059,922 A | * | 11/1977 | DiGiacinto | 47/82 |
| 4,869,019 A | * | 9/1989 | Ehrlich | 47/62 A |
| 4,920,695 A | * | 5/1990 | Garden | 47/83 |
| 4,986,027 A | * | 1/1991 | Harvey | 47/59 R |
| 5,381,625 A | * | 1/1995 | Wente | 47/83 |
| 5,502,923 A | * | 4/1996 | Bradshaw | 47/62 A |
| 5,555,676 A | * | 9/1996 | Lund | 47/82 |
| 6,615,542 B2 | * | 9/2003 | Ware | 47/83 |
| 6,874,278 B2 | * | 4/2005 | Felknor et al. | 47/67 |

FOREIGN PATENT DOCUMENTS

DE    3223644 A1  * 12/1983

* cited by examiner

*Primary Examiner*—Son T. Nguyen
(74) *Attorney, Agent, or Firm*—Michael E. McKee

(57) ABSTRACT

A planter for growing a transplantable plant within dirt or potting soil includes a container for containing dirt or potting soil and which has sidewalls and an interior. The sidewalls defines at least one grow port which provides access to the interior of the container, and the planter further includes a plant insertion sleeve having two side sections which are hingedly connected to one another for hinged movement between opened and closed conditions so that when the sleeve is positioned in its opened condition, the root system of a plant to be transplanted is positionable within one of the side sections of the sleeve, and the side sections can be subsequently moved to a closed condition about the root system to place the plant insertion sleeve and root system in condition for insertion into a grow port of the container for continued growth of the plant within dirt or potting soil contained within the container.

20 Claims, 3 Drawing Sheets

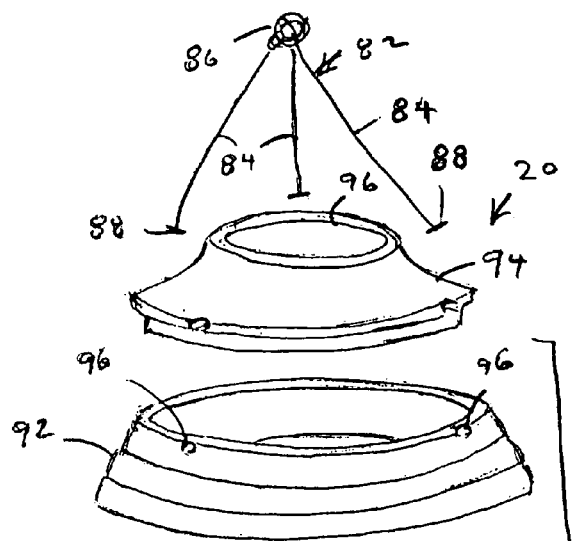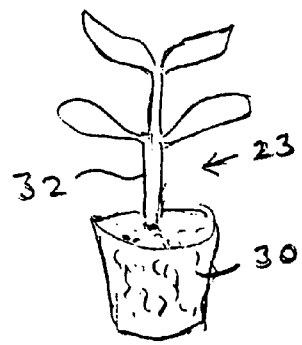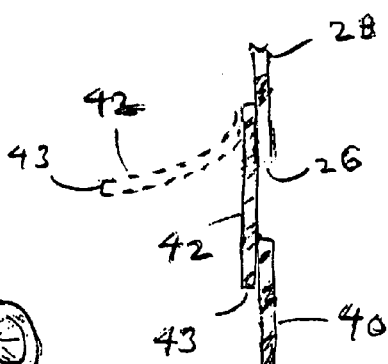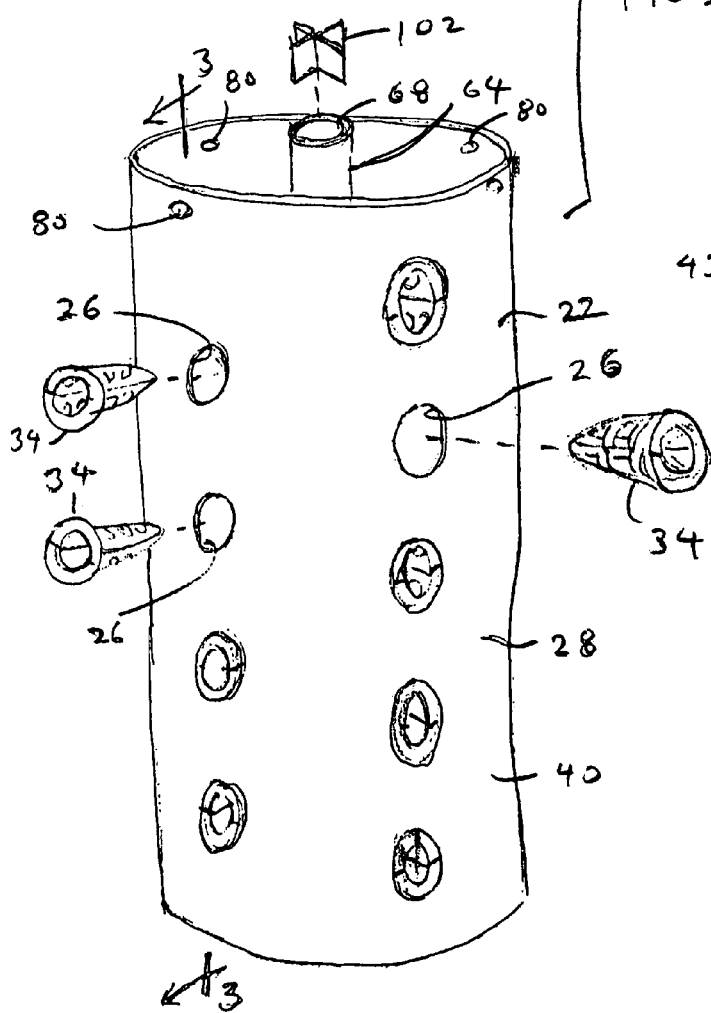
FIG. 1
FIG. 2
FIG. 3

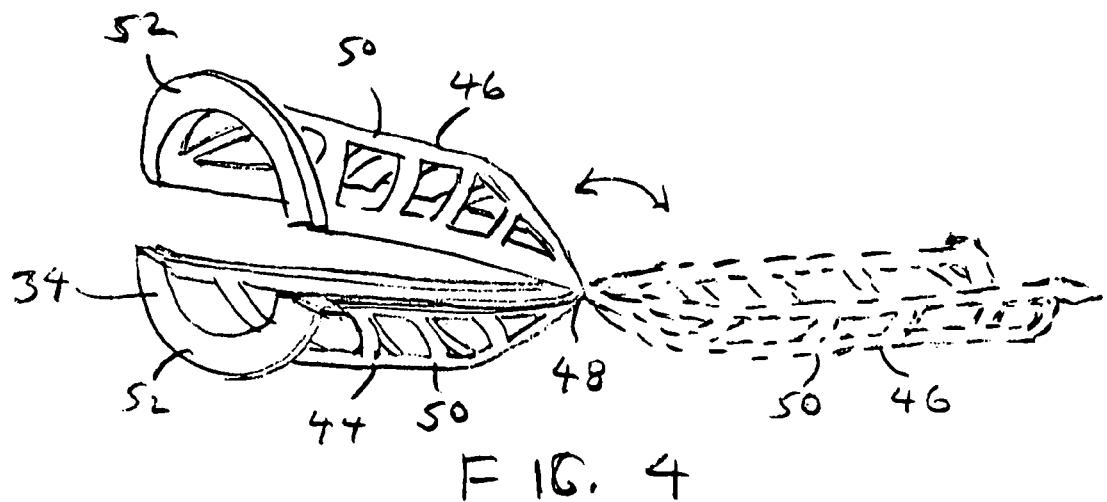
FIG. 4
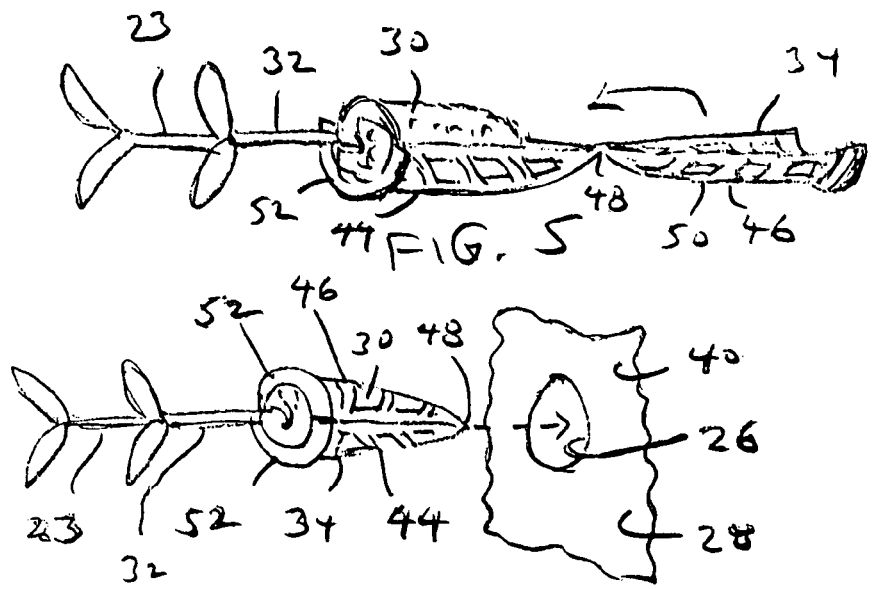
FIG. 5
FIG. 6
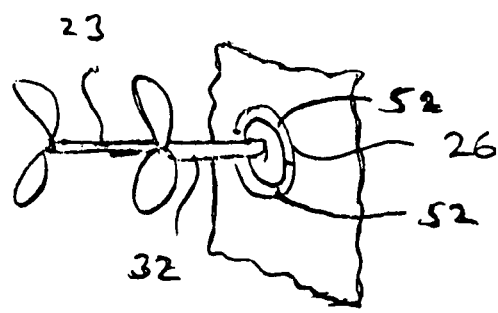
FIG. 7

PLANTER FOR GROWING PLANTS

The benefit of Provisional Application No. 60/541,193, filed Feb. 2, 2004 and entitled PLANTER FOR GROWING PLANTS, is hereby claimed. The disclosure of this referenced provisional patent application is incorporated herein by reference.

BACKGROUND OF THE INVENTION

This invention relates generally to gardening accessories and relates, more particularly, to planters within which plants are transplanted for growth.

The class of planters with which this invention is concerned include those which are adapted to contain dirt or potting soil and a plant which is transplanted within the dirt or potting soil so that the plant continues its growth within the planter.

Accordingly, it is an object of the present invention to provide a new and improved planter within which a plant can be transplanted for growth.

Another object of the present invention is to provide such a planter within which plants are transplanted for growth of the plant other than in an upright condition or, in other words, so that its root end is not directed downwardly.

A further object of the present invention is to provide such a planter within which plants are transplanted for growth so that the root ends thereof are directed somewhat horizontally.

Still another object of the present invention is to provide such a planter which can be easily suspended above the ground for tending of the plants grown therein.

Still one more object of the present invention is to provide such a planter wherein plants being grown therein can be fed and watered with relative ease.

Yet another object of the present invention is to provide such a planter which is readily collapsible to facilitate shipping, packaging and storing of the planter.

A still further object of the present invention is to provide such a planter which is uncomplicated in structure, yet effective in operation.

SUMMARY OF THE INVENTION

This invention resides in a planter for growing a transplantable plant within dirt or potting soil wherein the transplantable plant has a root system and a stem which extends from the root system.

The planter includes a container for containing dirt or potting soil and which has sidewalls and an interior. The sidewalls, in turn, define a grow port which provides access to the interior of the container. The planter further includes a plant insertion sleeve having two side sections which are hingedly connected to one another along a hinge for hinged movement between opened and closed conditions so that when the sleeve is positioned in its opened condition, the root system of the plant to be transplanted can be positioned within one of the side sections. By subsequently moving the side sections of the sleeve to a closed condition about the root system so that the hinge of the sleeve is directed away from the root system in a direction opposite the stem of the plant, the sleeve and plant can be inserted hinge-first into the grow port of the container for continued growth of the plant within dirt or potting soil contained within the container.

BRIEF DESCRIPTION OF THE DRAWINGS

FIG. 1 is an exploded perspective view of a planter within which features of the invention are embodied.

FIG. 2 is a view of a plant capable of being transplanted into the FIG. 1 planter.

FIG. 3 is a fragmentary cross-sectional view taken about along line 3—3 of FIG. 1 illustrating a flap which backs one of the grow ports of the planter.

FIG. 4 is a perspective view of a plant insertion sleeve of the FIG. 1 planter.

FIGS. 5–7 are views illustrating the steps involved in transplanting a plant into the FIG. 1 planter with the plant insertion sleeve of FIG. 4.

DETAILED DESCRIPTION OF AN ILLUSTRATIVE EMBODIMENT

Figure 8:
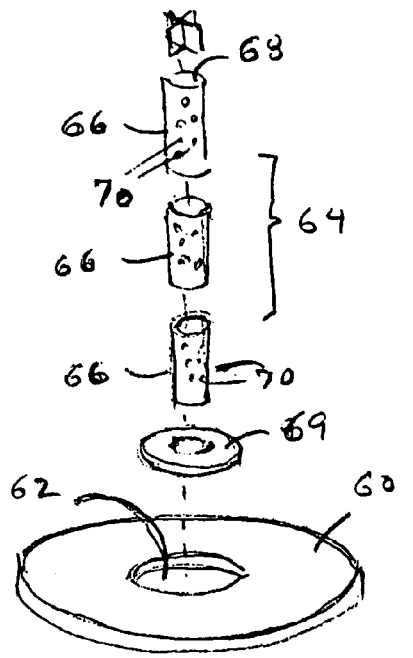
FIG. 8 is a perspective view of the internal feeding and watering tube assembly of the FIG. 1 planter.

Turning now to the drawings in greater detail and considering first FIG. 1, there is illustrated an embodiment, generally indicated 20, of a planter within which features of the present invention are embodied and from which a plurality of transplanted plants can be grown out of the sides thereof. To this end, the planter 20 includes an elongated, cylindrical container 22 which is adapted to hold dirt or potting soil, and the container 22 includes a sidewall 28 having openings, or grow ports, 26 through which the transplanted plants extend. As will be apparent herein, the planter 20 includes means, described herein, which cooperates with the transplanted plants for securing the plants within the grow ports 26 of the container 22.

An example of a plant capable of being transplanted into the planter 20 for continued growth of the plant is illustrated FIG. 2. The depicted plant, indicated generally 23, includes a root system 30 (which commonly is encased in an amount of dirt) and a stem 32 which extends from the root system 30. As will be apparent herein, the planter 20 further includes a plurality of plant insertion sleeves 34 (FIG. 1) for securing each transplanted plant 23 within a corresponding grow port 26 of the container 22, and each plant insertion sleeve 34 is positionable about a root system 30 of a corresponding plant 23 and insertable, together with the root system 30, through a corresponding grow port 26 of the container sidewall 28. Once inserted within the grow port 26 so that the plant insertion sleeve 34 is entirely positioned within the grow port 26 (and into the dirt and potting soil contained within the container 22), the plant insertion sleeve 34 is difficult to remove from the container. Consequently, each plant insertion sleeve 34, with the plant held therein, cooperates with the remainder of the planter 20 and the dirt or potting soil held therein so that the sleeve 34 is suitably held within the container 22.

With reference still to FIG. 1, the container 22 of the planter 20 includes an elongate bag 40 constructed, for example, of a flexible plastic material and having a bottom and sidewalls which, when filled with dirt or potting soil to an expanded condition, is substantially cylindrical in form. As will be apparent herein, the sidewalls 28 of the container 22 are provided by the sidewalls of the bag 40. Defined along the sidewalls 28 are a plurality of circular openings which provide the grow ports 26 and which provide access to the interior of the bag 40 through the sidewalls thereof. Within the bag 40 of the depicted container 22, there are defined thirty openings, or grow ports, 26 which are regularly disposed about the bag sidewalls, but the grow ports of a planter embodying the features of the present invention can include an alternative number of grow ports.

As best shown in FIG. 3, there is associated with each grow port 26 a flexible flap 42 which is attached to the container bag 40 (i.e. above) a corresponding grow port 26 so as to cover the port 26 from the interior of the bag 40. As will be apparent herein, as the bag 40 is filled with dirt or potting soil in preparation of the planter 20 for accepting plants for growth the flaps 42 prevent the dirt or potting soil from spilling out of the bag 40 from the interior thereof. Each flap 42 of the depicted planter 20 is sealed, or bonded, to the interior of the bag 40 directly above its corresponding port 26 so that its lower edge, indicated 43 in FIG. 3, can be moved from a port-covering position as illustrated in solid lines in FIG. 3 to a rearwardly-bent position as illustrated in phantom in FIG. 3. Therefore and as a root system 30 and plant insertion sleeve 34 is inserted through a grow port 26 covered by the flap 42, the flap 30 and plant insertion sleeve 34 inserted into the grow port 26 so that the root system 30 can be inserted as far into the bag 40 (and the dirt or potting soil contained therein) as is desired with little or no resistance from the flap 42.

With reference to FIGS. 4 and 5, each plant insertion sleeve 34 includes two side, or half, sections 44 and 46 which are hingedly joined to one another in a manner described herein for hinged movement between an opened condition as illustrated in solid lines in FIG. 5 and a closed condition as illustrated in solid lines in FIG. 4. Each half section 44 or 46 is elongated in shape having two opposite ends (i.e. a distal end and a proximal end) and has a major portion 50 which is formed of a web of material providing openings therethrough and a semi-circular flange portion 52 formed at one end (i.e. the free end, or proximal end) of the major portion 50. Moreover, each half section 44 or 46 has a concave-shaped side which is somewhat trough-like in form so that when the half sections 44 and 46 are moved to the closed, or solid-line, position of FIG. 5, the plant insertion sleeve 34 defines a cavity which opens out of the end of the sleeve 34 corresponding with the semi-circular flange portions 52, and the semi-circular portions 52 cooperate to form a ring.

The half sections 44 and 46 are joined to one another at the common end (i.e. distal end) thereof, indicated 48, opposite the other (semi-circular portion 50-forming) end thereof to accommodate hinged movement of the two half sections 44 and 46 about a pivot axis which is oriented substantially perpendicular to the longitudinal axis of each half section 44 or 46. Although the plant insertion sleeve 34 can be formed out of any of a number of different materials, it is preferable that the sleeve 34 be molded from plastic as a single piece so that the end portions of the sleeve 34 disposed at the hinge end 48 of the half sections 44 and 46 act as a living hinge which permits the half sections 44 and 46 to be hingedly moved between the open condition (illustrated in solid lines in FIG. 5) and the closed condition (illustrated in solid lines in FIG. 4) without damage to the material comprising the half sections 44 and 46.

In use and as illustrated in FIGS. 5 and 6, the plant insertion sleeve 34 is moved to its opened condition, and a plant root system 30 (with the dirt encased about) is positioned within the concave side of one of the half sections 44 (as illustrated in FIG. 5) so that the stem 32 of the plant 23 is directed out through the semi-circular portion-forming end of the half section 44, and then the half sections 44 and 46 are moved to the closed condition (thereby moving the other half section 46 to its position illustrated in solid lines in FIG. 4) to thereby capture the root system 30 between the two half sections 44 and 46. If necessary, dirt which encases the root system 30 may have to be cut away or compressed to shape the root system into a form which fits within the half section 44 and thereby permits the half sections 44, 46 to be closed around the root system. With the root system 30 captured between the two half sections 44 and 46 (as illustrated in FIG. 6), the insertion sleeve 34 is directed (substantially horizontally) hinge end 48-first through one of the grow ports 26 provided in a sidewall of the container 22 (as illustrated in FIG. 6) until the ring-forming semi-circular portions 52 are substantially embedded within the dirt or potting soil contained within the container 20. As mentioned earlier, as the insertion sleeve 34, along with the root system 30 captured therein, is inserted through the grow port 26, the flap 42 (FIG. 3) flexes rearwardly of the port 26 to accommodate the insertion of the sleeve 34 through the port 26.

It has been found that the dirt or potting soil contained within the container 22 exerts very little resistance to the ingress of the plant insertion sleeve 34 into the container 22 through the grow port 26. Furthermore and upon entrance of the insertion sleeve 34 into a corresponding grow port 26, the dirt or potting soil which is present about the sleeve 34 helps to hold the sleeve 34 in a stationary position within the container 22. To lessen any tendency of the hinge (end) 48 of the closed sleeve 34 to tilt upwardly within the container 22 in response to the weight of the stem 32 of the plant 23 and as an alternative to inserting the insertion sleeve 34 substantially horizontally into a grow port 26, the insertion sleeve 34 can be inserted into the grow port 26 at an angle which is slightly downward relative to the horizontal. The root system 20 which grows as a result of the continued growth of the plant 23 is thereafter free to grow and expand through the openings provided in the web material of the insertion sleeve 34, and that subsequent growth of the root system 34 further aids in the securement of the sleeve 34 (and plant 23) within the grow port 26 of the container 22.

It will be understood that each grow port 26 of the container 22 is adapted to accept a plant insertion sleeve 34 and the root system 30 of a plant 23 captured within the sleeve 34 so that a large number (e.g. thirty) of plants can be grown within a single planter 20.

With reference to FIG. 8 and to promote and preserve the cylindrical form of the bag 40 when the bag 40 is filled with dirt or potting soil, the planter 20 includes a bottom plate 60 which is circular and disc-like in form and which is positionable within the bottom of the bag 40 before dirt or potting soil is poured into the bag 40. The bottom plate 60 further defines a circular indentation 62 positioned centrally thereof for a reason which will be apparent herein.

To permit a user to feed and water the plants grown within the planter 20, the planter 20 includes a tube assembly 64 (FIG. 8) comprised of a plurality of tubular sections 66 which can be joined in an end-to-end fashion to provide an elongated conduit having an open mouth 68 at the upper end thereof for accepting water or fertilizer (liquid or granular) directed therein. Defined along the length of the tube assembly 64 are a series of holes 70 through which the water or other liquid which is poured, or directed, into the mouth 68 of the tube assembly 64 is permitted to flow or seep into the dirt or potting soil which surrounds the tube assembly 64. Attachable to the lowermost tubular section 66 of the tube assembly 64 is a disc member 69 whose diameter corresponds with (i.e. is slightly smaller than) the diameter of the indentation 62 of the bottom plate 60.

When the planter 20 is assembled (and before dirt or soil is poured into the bag 40), the bottom plate 60 is positioned within the bottom of the bag 40 so that the indentation 62 opens upwardly, and then the tube assembly 64 (with the disc member 69 attached thereto) is positioned disc member end-down into the bag 40 so that the disc member 69 is accepted by the indentation 62. While the tube assembly 64 is manually held upright (with its bottom end being steadied by the cooperation between the disc member 69 and the indentation 62, the bag 40 can be filled with dirt or potting soil, as desired, as the dirt or potting soil is positioned (e.g. poured) about the tube assembly 64.

Figure 9:
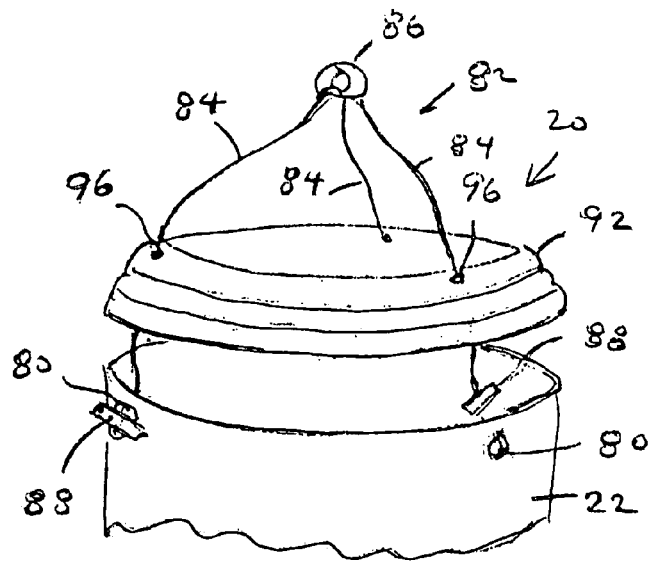
FIG. 9 is a fragmentary perspective view of the FIG. 1 planter illustrating the means by which the planter is suspended from an elevated support.

With reference to FIG. 9, the planter 20 further includes means by which the container 22 can be suspended from an elevated support so that the planter 20 is rendered as a hanging planter. To this end, the container 22 includes a plurality of (e.g. three) reinforced openings 80 spaced about the upper end of the container 22, as illustrated in FIG. 9, and there is provided a hanger system, generally indicated 82, which can be attached to the container 22 by way of the reinforced openings 80 for suspension of the container 22 from an elevated support (not shown). In particular, the hanger system 82 includes a plurality of (i.e. three) cable members 84 which are joined together at one end thereof (i.e. the upper end as seen in FIG. 9) by way of a ring 86 which is adapted to be looped about a hook (not shown) or similar fastener joined to the elevated support for suspension of the container 22 therefrom. The cable system 82 further includes a set of pins 88 which are each joined to the end of a corresponding cable member 84 opposite the ring end thereof. To attach the pins 88 to the container openings 80, each pin 88 is manually oriented alongside its corresponding cable member 84 and then inserted one-end-first through a reinforced opening 80 from the inside of the container 22. By turning the pin 88 loose after it has completely passed through the opening 80, the pin 88 cannot be pulled through the opening 80 by pulling upon the opposite end of the cable member 84.

The planter 20 also includes a decorative rim member 92, best shown in FIG. 9, which is positionable atop the container 22 and which supports a top member 94 (FIGS. 1 and 10) described herein. The rim member 92 is formed in the shape of a ring and is adapted to rest along the upper edge of the container 22 as the planter 20 is suspended from an elevated support. In the depicted planter 20, the cable members 84 of the cable system 82 are intended to pass through preformed holes 96 provided in the rim member 92 to help secure the rim member 92 in place atop the container 22 during use of the planter 20. In this connection, each pin 80 of the cable system 82 is initially routed through a corresponding preformed hole 96 before being routed through a corresponding reinforced opening 80 of the container 22 for attachment thereto.

Figure 10:
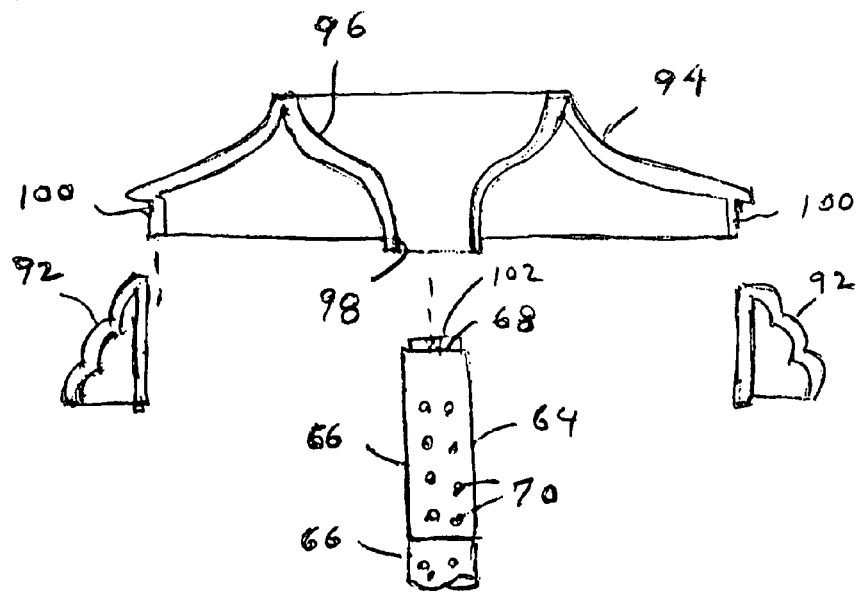
FIG. 10 is a transverse cross sectional view of the upper end of the FIG. 1 planter illustrating the interfitting relationship between various components of the FIG. 1 planter.

With reference to FIGS. 1 and 10, the top member 94, introduced above, of the planter 20 serves as a cover for the bag 40 and cooperatively interfits with the open mouth of the tube assembly 64. In this connection, the top member 94 includes a central, funnel-shaped section 96 for funneling water and fertilizer poured therein downwardly to a central opening 98. The region of the funnel-shaped section 96 which surrounds the central opening 98 is adapted to be accepted by the open mouth 68 of the tube assembly 64 so that by positioning the top member 94 atop the bag 40 so that the funnel-shaped section 96 is accepted by the mouth 68 of the tube assembly 64, the top member 94 helps to maintain the tube assembly 64 in a vertical orientation within the bag 40.

Furthermore, the top member 96 includes an outer edge 100 (best shown in FIG. 10) which can be accepted by the interior of the rim member 92 for support of the top member 96 atop the rim member 92.

It will be understood that water or liquid fertilizer which is desired to be poured into the tube assembly 64 for the purposes of watering and feeding the plants grown within the container 22 is poured first into the funnel-shaped section 96 of the top member and thereafter permitted to flow downwardly into the open mouth 68 of the tube assembly 64. Thus, the funnel-shaped section 96 acts as a funnel to direct water or liquid fertilizer poured thereupon downwardly into the tube assembly 64 where it is dispersed through the dirt or potting soil contained within the bag 40 by way of the holes 70. If desired, a butterfly-shaped member 102 (FIGS. 1 and 10) can be positioned within the mouth 68 of the tube assembly 64 to prevent the development of a whirlpool at the mouth 68 when water and fertilizer are poured into the funnel-shaped section 96.

It follows that the provision of the tube assembly 64 within the planter 20 provides an easy means of delivering water and fertilizer to the plants being grown within the planter 20. In other words, by pouring water or fertilizer into the tube assembly 64 through the funnel-shaped section 96 of the top member 94, the water and fertilizer is dispersed throughout the dirt or potting soil contained within the bag 40 by way of the tube assembly 64.

It will be understood that numerous modifications and substitutions can be had to the aforedescribed embodiment without departing from the spirit of the invention. For example, although the aforedescribed embodiment 20 has been shown and described as being capable of being suspended from an elevated support, a planter which embodies features of the present invention can include a floor-engaging base which permits the planter to be free-standing. Accordingly, the aforedescribed embodiment is intended for the purpose of illustration and not as limitation.

The invention claimed is:

1. A planter for growing a transplantable plant within dirt or potting soil wherein the transplantable plant has a root system including two opposite ends and the plant further has a stem which extends from one end of the root system, the planter comprising:

a container for containing dirt or potting soil and having sidewalls and an interior and wherein the sidewalls of the container define a grow port which provides access to the interior; and a plant insertion sleeve having two side sections which are hingedly connected to one another along a hinge for hinged movement between opened and closed conditions so that when the sleeve is positioned between opened and closed conditions so that when the sleeve is positioned in its opened condition, the root system of a plant to be transplanted can be positioned within one of the side sections and the side sections can be subsequently closed about the root system so that when the container contains dirt or potting soil and the side sections of the plant insertion sleeve are closed about the root system of the plant to be transplanted, the plant insertion sleeve is in condition to be inserted into the grow port of the planter and into any dirt or potting soil contained within the container for continued growth of the plant within the planter;

each of the two side sections of the plant insertion sleeve is elongated in share and has a distal end and a proximal end and are hingedly joined to one another so that the two side sections of the sleeve can be hingedly moved between the opened and closed conditions and so that when closed about the root system of the plant, the proximal ends of the side sections collectively encircle the one end of the root system from which the stem of the plant extends and the distal ends of the side sections are disposed adjacent the end of the root system opposite said one end;

the side sections of the plant insertion sleeve being shaped so that when the side sections are moved to the closed condition about the root system of the plant, the distal ends form a relatively sharp leading edge which facilitates the insertion of the side sections of the plant insertion sleeve, when in a closed condition, distal-end-first through the grow port of the planter and deeply into the dirt or potting soil contained within the container.

2. The planter as defined in claim 1 wherein each of the two side sections of the plant insertion sleeve has a major portion which is formed of a web of material providing openings therethrough so that when the two side sections are closed about the root system of the plant to be transplanted and inserted into the grow port of the planter, the root system has access to the dirt or potting soil contained within the container through the openings provided in the web of material.

3. The planter as defined in claim 1 wherein the two side sections of the plant insertion sleeve are hingedly joined to one another at the distal ends thereof to accommodate hinged movement of the two side sections about a pivot axis which is oriented substantially perpendicular to the longitudinal axis of each side section.

4. The planter as defined in claim 1 wherein the two side sections are hingedly joined to one another with a living hinge so that the two side sections can be hingedly moved between the opened and closed condition without damage to the material comprising the side sections.

5. The planter as defined in claim 1 wherein each of the side sections provides a trough which extends between the distal and proximal ends so that when the side sections are moved to the closed condition, the troughs of the side sections cooperate to form a cavity within which the root system of a plant to be transplanted is positioned.

6. The planter as defined in claim 5 wherein each side section includes a semicircular flange portion at the proximal end thereof so that when the side sections are moved to the closed condition about the root system of a plant to be transplanted, the semi-circular flange portions cooperate to form a ring which encircles the one end of the root system of the plant to be transplanted.

7. The planter as defined in claim 1 wherein the grow port defined within the sidewall of the container is sized to accept the entirety of the plant insertion sleeve when the plant insertion sleeve is closed about the root system of a plant to be transplanted and inserted into the grow port.

8. The planter as defined in claim 1 wherein the grow port is a first grow port and the sidewalls of the container define additional grow ports disposed thereacross, the plant insertion sleeve is a first plant insertion sleeve and the planter further includes additional plant insertion sleeves constructed like that of the first plant insertion sleeve so that the planter accommodates the transplanting of a plurality of plants into the container by closing each plant insertion sleeve about the root system of a corresponding plant to be transplanted and inserting each plant insertion sleeve, when in its closed condition, through a corresponding grow port of the container.

9. The planter as defined in claim 1 wherein the container includes a flexible flap which is attached to the container sidewalls for releasably covering the grow port from the interior side thereof so that when the side sections of the plant insertion sleeve, when in the closed condition, are inserted distal-end-first through the grow port and pushed against the flexible flap, the flexible flap is flexed inwardly of the container by the plant insertion sleeve to a condition at which the grow port is uncovered and thereby permits the side sections of the plant insertion sleeve to continue to be inserted into the container unobstructed by the flap.

10. The planter as defined in claim 1 wherein the container includes an upper end, and the planter further includes a feeding and watering tube assembly which extends downwardly into the container from the upper end thereof and which is accessible from the upper end of the container.

11. The planter as defined in claim 1 wherein the container has an upper end and the planter further includes means for providing an elongated conduit which extends downwardly into the container from the upper end thereof, and the conduit includes a series of holes defined along the length thereof so that when dirt or potting soil is placed within the container and around the conduit, water or fertilizer can be poured downwardly into the conduit from the upper end of the container and seep into the dirt or potting soil through the series of holes defined along the length of the conduit.

12. The planter as defined in claim 11 wherein the elongated conduit includes a plurality of tubular sections which are joined in an end-to-end fashion for positioning within the container and which can be disassembled for storage or shipment of the planter.

13. The planter as defined in claim 11 further including a top member having a funnelshaped section which opens downwardly into the elongated conduit to facilitate the pouring of water or fertilizer into the elongated conduit from the upper end of the container.

14. The planter as defined in claim 1 wherein the sidewalls of the container are cylindrical in form.

15. A planter for growing a plurality of transplantable plants within dirt or potting soil wherein each of the transplantable plants has a root system including two opposite ends and further has a stem which extends from one end of the root system, the planter comprising:

a container for containing dirt or potting soil and having sidewalls and an interior and wherein the sidewalls of the container define a plurality of grow ports disposed across the container sidewalls and which provide access to the interior through the sidewalls; and a plurality of plant insertion sleeves wherein each plant insertion sleeve has two side sections which are hingedly connected to one another along a hinge for hinged movement relative to one another between opened and closed conditions so that when each sleeve is positioned in its opened condition, the root system of a plant to be transplanted can be positioned within one of the side sections can be subsequently closed about the root system so that when the container contains dirt or potting soil and the side sections of each plant insertion sleeve are closed about the root system of a corresponding plant to be transplanted, each plant insertion sleeve is in condition to be inserted into a corresponding grow port of the planter and into any dirt or potting soil contained within the container for continued growth of the plants within the planter;

each of the two side sections of each plant insertion sleeve is elongated in shape and has a distal end and a proximal end and so that when closed about the root system of the plant, the proximal ends of the side sections collectively encircle the one end of the root system from which the stem of the plant extends and the distal ends of the side sections are disposed adjacent the end of the root system opposite said one end;

the side sections of each plant insertion sleeve being shaped so that when the side sections are moved to the closed condition about the root system of the plant, the distal ends form a relatively sharp leading edge which facilitates the insertion of the side sections of the plant insertion sleeve, when in the closed condition, distal-end-first through a corresponding grow port of the planter and deeply into the dirt or potting soil contained within the container.

16. The planter as defined in claim 15 wherein each of the two side sections of each plant insertion sleeve has a major portion which is formed of a web of material providing openings therethrough so that when the two side sections of each plant insertion sleeve are closed about the root system of a corresponding plant to be transplanted and inserted into a corresponding grow port of the planter, the root system of each plant has access to the dirt or potting soil contained within the container through the openings provided in the web of material of the corresponding plant insertion sleeve.

17. The planter as defined in claim 15 wherein the two side sections of each plant insertion sleeve are hingedly joined to one another at the distal ends thereof to accommodate hinged movement of the two side sections about a pivot axis which is oriented substantially perpendicular to the longitudinal axis of each side section, and the two side sections of each plant insertion sleeve are hingedly joined to one another at the distal ends thereof with a living hinge so that the two side sections can be hingedly moved between the opened and closed conditions without damage to the material comprising the side sections.

18. The planter as defined in claim 15 wherein each of the side sections is elongated in shape having a distal end and a proximal end, and each side section provides a trough which extends between the distal and proximal ends so that when the side sections are moved to the closed condition, the troughs of the side sections cooperate to form a cavity within which the root system of a plant to be transplanted is positioned.

19. The planter as defined in claim 15 wherein the container includes a plurality of flexible flaps wherein each flap is attached to the container sidewalls for releasably covering a corresponding grow port from the interior side thereof and which accommodates the insertion of a plant insertion sleeve inwardly of the container through a corresponding grow port so that when the side sections of the plant insertion sleeve, when in the closed condition, are inserted distal-end-first through the grow port and pushed against the flexible flap, the flexible flap is flexed inwardly of the container by the plant insertion sleeve to a condition at which the grow port is uncovered and thereby prevents the side sections of the plant insertion sleeve to continue to be inserted into the container unobstructed by the flap.

20. The planter as defined in claim 15 wherein the container includes an upper end, and the planter further includes a feeding and watering tube assembly which extends downwardly into the container from the upper end thereof and which is accessible from the upper end of the container.

* * * * *